(12) United States Patent
Xie

(10) Patent No.: US 10,376,912 B2
(45) Date of Patent: *Aug. 13, 2019

(54) APPARATUS AND METHOD FOR DEPOSITING COLOR INTO CRACKS OF A MOVING FORMED QUARTZ SLAB TO CREATE VEINS IN AN ENGINEERED STONE

(71) Applicant: Alex Xie, West Windsor, NJ (US)

(72) Inventor: Alex Xie, West Windsor, NJ (US)

(*) Notice: Subject to any disclaimer, the term of this patent is extended or adjusted under 35 U.S.C. 154(b) by 0 days.

This patent is subject to a terminal disclaimer.

(21) Appl. No.: 16/259,816

(22) Filed: Jan. 28, 2019

(65) Prior Publication Data

US 2019/0201928 A1 Jul. 4, 2019

Related U.S. Application Data

(60) Continuation-in-part of application No. 16/131,103, filed on Sep. 14, 2018, now Pat. No. 10,189,041, (Continued)

(51) Int. Cl.
| | |
|---|---|
| *C04B 41/61* | (2006.01) |
| *C04B 41/45* | (2006.01) |
| *B05C 9/10* | (2006.01) |
| *B05B 1/20* | (2006.01) |
| *B05D 3/12* | (2006.01) |
| *B05D 5/06* | (2006.01) |

(Continued)

(52) U.S. Cl.
CPC ............. *B05B 12/02* (2013.01); *B05B 1/20* (2013.01); *B05C 9/10* (2013.01); *B05C 13/02* (2013.01); *B05D 1/02* (2013.01); *B05D 3/12* (2013.01); *B05D 5/061* (2013.01); *C04B 41/009* (2013.01); *C04B 41/45* (2013.01); *C04B 41/4574* (2013.01); *C04B 41/61* (2013.01); *B29C 39/20* (2013.01); *C04B 41/4576* (2013.01)

(58) Field of Classification Search
CPC ........................................................ B05D 3/12
See application file for complete search history.

(56) References Cited

U.S. PATENT DOCUMENTS

| | | | |
|---|---|---|---|
| 704,621 A * | 7/1902 | Czermak | B29C 45/006 264/152 |
| 1,597,103 A | 8/1926 | Oberherr | |

(Continued)

FOREIGN PATENT DOCUMENTS

| | | |
|---|---|---|
| CN | 204842049 U | 12/2015 |
| FR | 002627424 A1 | 8/1989 |

*Primary Examiner* — Xiao S Zhao
(74) *Attorney, Agent, or Firm* — Walter J. Tencza, Jr.

(57) ABSTRACT

An apparatus including a first device which moves a first portion of a soft, damp, slightly pressed slab out of alignment with a majority of the slab and thus introduces a first crack in the slab; and a device for spraying a first colored material into the first crack of the slab. The first device which moves the first portion of the slab out of alignment with the rest of the slab may include a first cylinder. The device for spraying the first colored material in the first crack of the slab may include a robotic apparatus. In at least one embodiment, the apparatus may also include a second device which moves a second portion of the slab out of alignment with the majority of the slab and thereby introduces a second crack in the slab.

12 Claims, 18 Drawing Sheets

Related U.S. Application Data which is a division of application No. 15/860,328, filed on Jan. 2, 2018, now Pat. No. 10,099,236.

(51) Int. Cl.
*C04B 41/00* (2006.01)
*B05B 12/02* (2006.01)
*B05C 13/02* (2006.01)
*B05D 1/02* (2006.01)
*B29C 39/20* (2006.01)

(56) References Cited

U.S. PATENT DOCUMENTS

| | | | |
|---|---|---|---|
| 1,735,674 A | 11/1929 | Copeland | |
| 1,935,985 A | 11/1933 | Oberherr | |
| 1,949,517 A | 3/1934 | Van Der Pyl | |
| 2,044,585 A | 6/1936 | Macht | |
| 2,140,197 A | 12/1938 | Batcheller | |
| 3,088,713 A | 5/1963 | Gard | |
| 3,318,984 A | 5/1967 | Dussel | |
| 4,013,616 A | 3/1977 | Wallace | |
| 4,209,486 A | 6/1980 | Ross | |
| 4,343,752 A | 8/1982 | Cann | |
| 4,540,037 A | 9/1985 | Langner | |
| 4,623,561 A | 11/1986 | Groothuizen | |
| 4,721,634 A * | 1/1988 | McKinnon | B28B 1/005 |
| | | | 427/263 |
| 5,266,253 A | 11/1993 | Dijkhuizen | |
| 5,795,513 A | 8/1998 | Austin | |
| 5,885,503 A | 3/1999 | Bordener | |
| 6,389,666 B1 | 5/2002 | Grothe | |
| 6,517,915 B1 | 2/2003 | Banus | |
| 6,702,967 B2 | 3/2004 | Overholt et al. | |
| 7,815,827 B2 | 10/2010 | Cruz | |
| 8,436,075 B2 | 5/2013 | Buskila et al. | |
| 8,702,886 B2 | 4/2014 | Yaniv et al. | |
| 9,186,819 B1 | 11/2015 | Grzeskowiak, II | |
| 9,718,303 B2 | 8/2017 | Greskowiak, II et al. | |
| 2004/0175514 A1 | 9/2004 | Stiattesi | |
| 2006/0101752 A1 | 5/2006 | Sakai | |
| 2012/0148811 A1 | 6/2012 | Rha | |
| 2012/0283384 A1 | 11/2012 | Cox | |
| 2014/0017486 A1* | 1/2014 | Yoo | B29C 67/0011 |
| | | | 428/325 |
| 2014/0127450 A1 | 5/2014 | Riman | |
| 2015/0344377 A1 | 12/2015 | Lee | |
| 2016/0236984 A1 | 8/2016 | Riman | |

* cited by examiner

APPARATUS AND METHOD FOR DEPOSITING COLOR INTO CRACKS OF A MOVING FORMED QUARTZ SLAB TO CREATE VEINS IN AN ENGINEERED STONE

CROSS REFERENCE TO RELATED APPLICATION(S)

The present application is a continuation in part of and claims the priority of U.S. patent application Ser. No. 16/131,103, titled "APPARATUS AND METHOD FOR SPRAYING COLOR INTO CRACKS OF A MOVING FORMED QUARTZ SLAB TO CREATE VEINS IN AN ENGINEERED STONE", filed on Sep. 14, 2018 which is a divisional of and claims the priority of U.S. patent application Ser. No. 15/860,328, titled "APPARATUS AND METHOD FOR SPRAYING COLOR INTO CRACKS OF A MOVING FORMED QUARTZ SLAB TO CREATE VEINS IN AN ENGINEERED STONE", filed on Jan. 2, 2018.

FIELD OF THE INVENTION

This invention relates to improved methods and apparatus concerning quartz slabs.

BACKGROUND OF THE INVENTION

Quartz is the second most abundant mineral in the Earth's crust and one of the hardest naturally occurring materials. One of its many uses is in "engineered stone". Engineered stone, including quartz, has become a common surfacing and countertop choice in many countries throughout the world. Its applications include kitchen and bathroom countertops, tables and desktops, floor tile, food service areas, wall cladding, and various other horizontal and vertical applications.

The production of engineered stone generally involves particulate materials such as ground quartz rock, crushed glass, rocks, pebbles, sand, shells, silicon, and other inorganic materials combined with polymers, binders, resins, colorants, dyes, etc. The particulate material(s) may be varying sizes ranging from four hundred mesh particle size to four mesh particle size with multiple materials of different sizes used simultaneously. The polymer may include agents to such as a binder, hardener, initiator, or combination of such. The particulate material(s) and polymers, binders, resins, colorants, dyes, etc. are then mixed resulting in a slightly damp mixture. This initial mixture may be processed through a crushing machine to reduce the size of the combined particles. The resultant, finer mixture may be poured into a supporting mold, tray, or other supporting structure. The mold or tray containing the damp mixture is then moved onto a conveyor belt with a backing sheet, then a processed damp "slab" is moved into a vacuum press machine to compress the material. The compressed material is then placed into a curing machine to be heated into a hardened quartz slab. After curing, the hardened slab is generally moved to a grinder to be grinded down to a desired thickness, followed by a polisher to finish the product.

Quartz based stone has many advantages over natural stone such as marble and granite. Compared to these natural stones quartz is harder, stronger, less water absorbent, and more resistant to staining, scratching, breakage, chemicals, and heat. One of the drawbacks of quartz is its perceived lack of natural, random looking veins and color patterns compared with natural stones. This invention addresses a method of producing a quartz based slab with single color patterns or multiple color patterns and/or veins.

SUMMARY OF THE INVENTION

In at least one embodiment, an apparatus is provided comprising a device which moves a first portion of a slab out of alignment with a majority of the slab and thereby introduces a first crack in the slab; and a device for spraying a first colored material into the first crack of the slab. The slab typically is in a soft, damp, slightly pressed state when the first portion of the slab is moved out of alignment with the majority of the slab.

In at least one embodiment, the device which moves the first portion of the slab out of alignment with the rest of the slab includes a first lift bar. The device for spraying the first colored material in the first crack of the slab may include a first spray bar having a plurality of nozzles fixed thereto, with the plurality of nozzles of the first spray bar arranged in a substantially straight line.

In at least one embodiment, the apparatus may include a device which moves a second portion of the slab out of alignment with the majority of the slab and thereby introduces a second crack in the slab, while the first portion of the slab is out of alignment with the majority of the slab in response to the device which moves the first portion of the slab out of alignment with the majority of the slab. The apparatus may include a device for spraying a second colored material into the second crack of the slab, which differs from the device for spraying the first colored material into the first crack of the slab, such that the first colored material is configured to be sprayed into the first crack of the slab while the second colored material is sprayed into the second crack of the slab.

In at least one embodiment, the apparatus may also include a conveyor device; wherein the conveyor device is configured to move the slab over a least a portion of the device which moves the first portion of the slab out of alignment with the majority of the slab.

The conveyor device may be configured to move the slab over a least a portion of the device which moves the second portion of the slab out of alignment with the majority of the slab.

The device for spraying the first colored material in the first crack of the slab may include a first spray bar having a plurality of nozzles fixed thereto, with the plurality of nozzles of the first spray bar arranged in a substantially straight line. The device for spraying the second colored material in the second crack of the slab may include a second spray bar having a plurality of nozzles fixed thereto, with the plurality of nozzles of the second spray bar arranged in a substantially straight line.

The device which moves the first portion of the slab out of alignment with the majority of the slab may include a first lift bar; and the device which moves the second portion of the slab out of alignment with the majority of the slab may include a second lift bar.

In at least one embodiment, the apparatus may include a computer processor; and a computer memory; wherein the computer processor is programmed by software in the computer memory to control the device which moves the first portion of the slab out of alignment with the majority of the slab and thereby introduces the first crack in the slab; and the device for spraying the first colored material into the first crack of the slab.

A method is provided in at least one embodiment which may include moving a first portion of a slab out of alignment with a majority of the slab and thereby introducing a first crack in the slab; and spraying a first colored material into the first crack of the slab. The method may also include moving a second portion of a slab out of alignment with a majority of the slab and thereby introducing a second crack in the slab; and spraying a second colored material into the second crack of the slab; and wherein the second portion of the slab is moved out of alignment with the majority of the slab while the first portion of the slab is moved out of alignment with the majority of the slab.

The method may employ further method steps, and may employ structure as previously noted and as further noted in the present application.

In at least one embodiment an apparatus is provided comprising a first device which is configured to cause a first portion of a slab to move vertically out of alignment with an area of the slab surrounding the first portion of the slab and thereby introduces a first crack in the first portion of the slab, wherein the first device is configured to be located between the first portion and a ground surface, when the first crack is introduced; and a device for spraying a material having a color configured to spray a first material having a color into the first crack of the slab, so that the first crack sprayed with the first material becomes a vein having the color of the first material.

The apparatus may also include a conveyor device which is configured to move in a first direction; and wherein the conveyor device is configured to move the slab over at least a portion of the first device.

The apparatus may also include a second device which is configured to cause a second portion of the slab to move vertically out of alignment with an area of the slab surrounding the second portion of the slab and thereby introduces a second crack in the second portion of the slab, wherein the second device is configured to be located between the second portion and a ground surface, when the second crack is introduced; and wherein the device for spraying a material having a color is configured to spray a second material having a color into the second crack of the slab, so that the second crack sprayed with the second material becomes a vein having the color of the second material.

The apparatus may further include a plurality of further devices which are configured to cause a corresponding plurality of further portions of the slab to move vertically out of alignment with corresponding areas of the slab surrounding the corresponding plurality of further portions of the slab and thereby introduce a corresponding plurality of further cracks in the plurality of further portions of the slab, wherein each the plurality of devices is configured to be located between its corresponding portion and the ground surface, when the corresponding crack is introduced; and wherein the device for spraying the material having a color is configured to spray material having a color into the plurality of further cracks of the slab, so that the plurality of further cracks of the slab become veins having the color of the particular sprayed material.

The first device and the plurality of further devices may be arranged in a matrix of a plurality of rows and columns.

Each of the first device, the second device, and the plurality of further devices may be cylinders.

A computer processor may be provided for controlling the first device, the second device, the plurality of further devices, and the device for spraying.

In at least one embodiment a method is provided which may include the steps of causing a first portion of a slab to move vertically out of alignment with an area of the slab surrounding the first portion of the slab and thereby introducing a first crack in the first portion of the slab by using a first device located between the first portion and a ground surface to cause a force to be applied to the first portion of the slab; and spraying a first material having a color into the first crack of the slab, so that the first crack sprayed with the first material becomes a vein having the color of the first material.

The method may further include moving the slab over at least a portion of the first device before causing the first portion of the slab to move vertically out of alignment.

The method may further include causing a second portion of the slab to move vertically out of alignment with an area of the slab surrounding the second portion of the slab and thereby introducing a second crack in the second portion of the slab by using a second device located between the second portion and a ground surface to cause a force to be applied to the second portion of the slab; and spraying a second material having a color into the second crack of the slab, so that the second crack sprayed with the second material becomes a vein having the color of the second material.

The first and the second material may be the same or substantially the same.

The method may further include causing a plurality of further portions of the slab to move vertically out of alignment with corresponding areas of the slab surrounding the corresponding plurality of further portions of the slab and thereby introducing a corresponding plurality of further cracks in the plurality of further portions of the slab by using a plurality of further devices each located between each of the corresponding portions and the ground surface; and spraying a material having a color into the plurality of further cracks of the slab, so that the plurality of further cracks of the slab become veins having a color of a sprayed material.

The first device and the plurality of further devices may be arranged in a matrix of a plurality of rows and columns.

Each of the first device, the second device, and the plurality of further devices may be a cylinder.

A computer processor may control the steps of causing the first portion of a slab to move vertically out of alignment with an area of the slab; and spraying the first material having a color into the first crack of the slab.

DETAILED DESCRIPTION OF THE DRAWINGS

Figure 1:
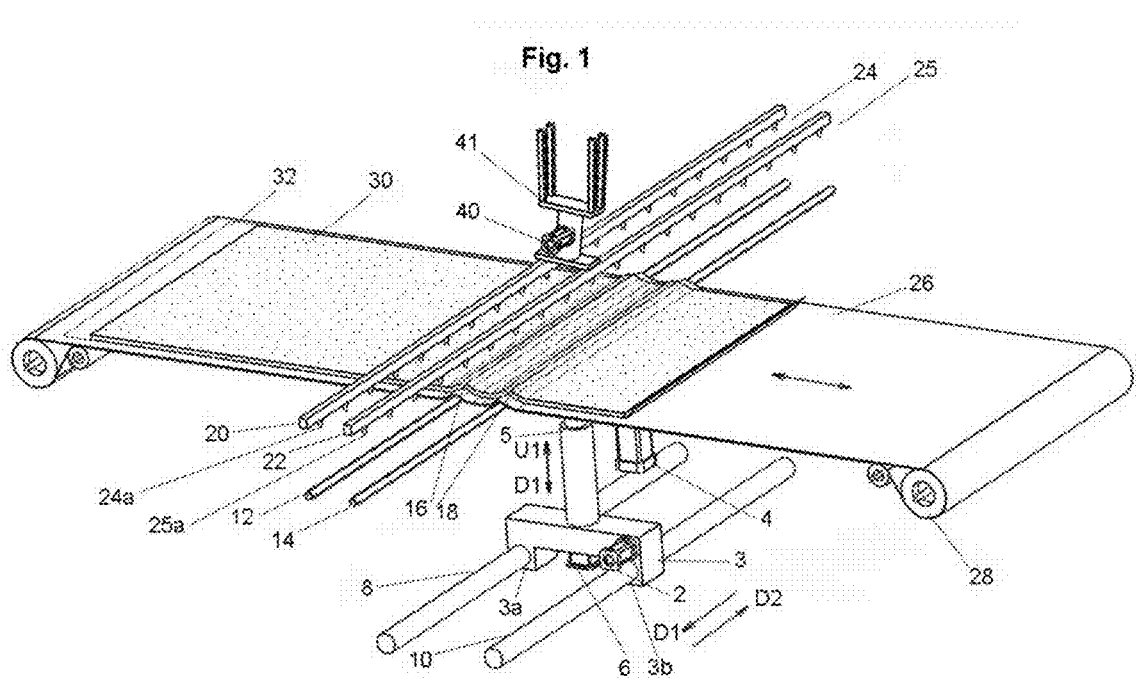
FIG. 1 shows a top, left, and front perspective view of an apparatus in accordance with an embodiment of the present invention, with the apparatus of FIG. 1, in a first state.

FIG. 1 shows a top, left, and front perspective view of an apparatus 1 in accordance with an embodiment of the present invention, with the apparatus of FIG. 1, in a first state. The apparatus 1 includes servo motor 2, servo motor 4, servo motor 6, rods or tracks 8 and 10, lift bars 12 and 14, spray bars 20 and 22, a plurality of nozzles 24, a plurality of nozzles 25, spray bar structure 41, spray bar rotation servo motor 40, conveyor belt 26, roller 28, formed quartz slab 30, and backing sheet 32. The formed quartz slab 30 in FIG. 1, is shown in a soft or damp form.

The apparatus 1 also includes U-shaped member 3, post 5, member 7, member 9, member 11, gear 13, and gear 15. The U-shaped member 3 may have openings 3a and 3b through which the rod or tracks 8 and 10 are inserted.

In operation, the U-shaped member 3 may be moved by the servo motor 2 to cause the U-shaped member 3 to slide in the directions D1 or D2, on the rods or tracks 8 and 10, while the rods or tracks 8 and 10 remain stationary.

In addition, the lift bars 12 and 14 and spray bars 20 and 22 together may be rotated to change their orientation with respect to the conveyor belt 26, with respect to the U-shaped member 3, and with respect to the conveyor belt length direction. For example, in FIG. 1, the conveyor belt 26 is shown perpendicular or substantially perpendicular to the rods or tracks 8 and 10, and with respect to the direction arrows or directions D1 and D2, but lift bars 12 and 14 and spray bars 20 and 22 may be rotated (while the conveyor belt 26 remains stationary) to be at a different angle with respect to the rods or tracks 8 and 10, and with respect to the direction arrows or directions D1 and D2, and with respect to conveyor belt 26 or rotated to be parallel to the rods or tracks 8 and 10, and parallel to the direction arrows or directions D1 and D2.

Figure 3:
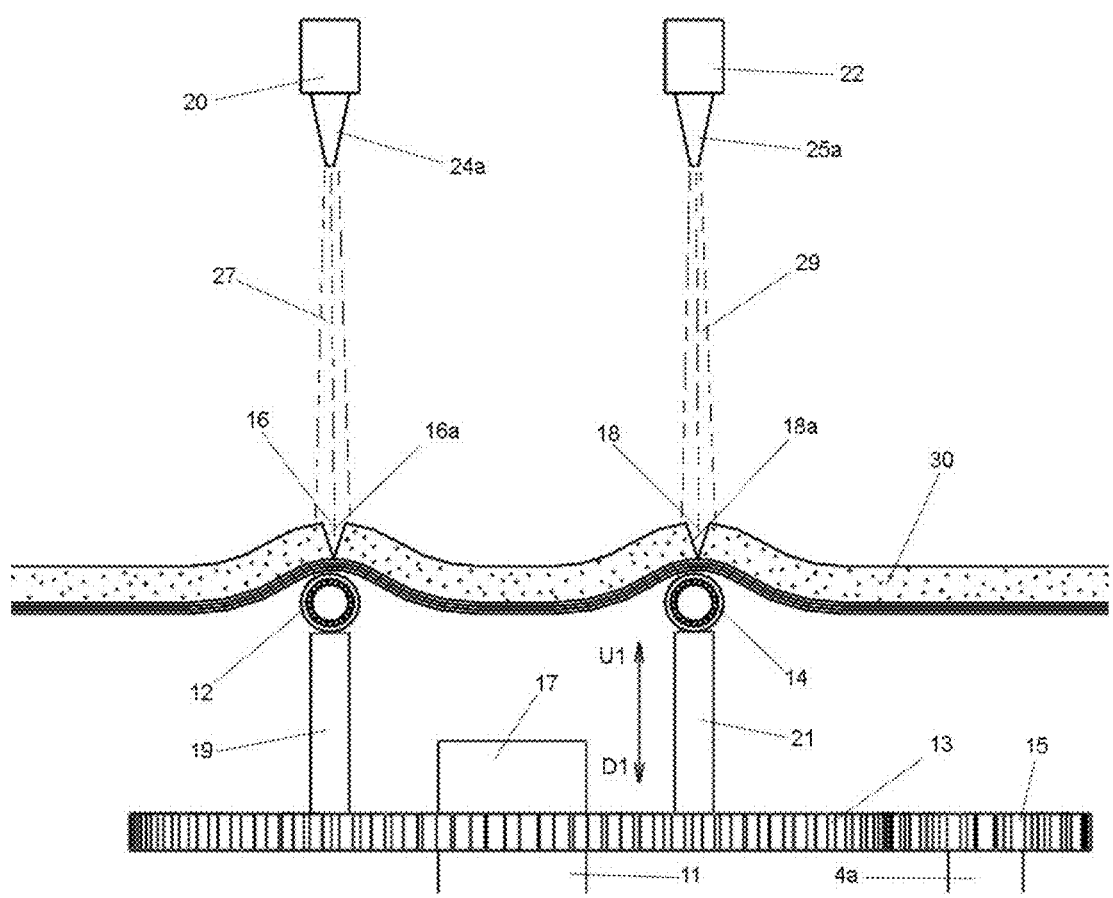
FIG. 3 shows a close up side view of a portion of the apparatus of FIG. 1, with the apparatus of FIG. 1 in the first state.

Also, the servo motor 6 can drive the lift bars 12 and 14 up and down in the directions U1 and D1, shown in FIG. 3, by driving members 7, 11, and 17 up and down to cause the members 19 and 21 to go up and down, and the attached lift bars 12 and 14 to go up and down in the directions U1 and D1, shown in FIG. 3.

The servo motor 4 can drive lift bars 12 and 14 and the servo motor 40 can drive spray bars 20 and 22 from zero to one hundred and eighty degrees, with respect to the conveyor belt 26. For example, in FIG. 1, the lift bars 12 and 14 and spray bars 20 and 22 are ninety degrees with respect to the length of the conveyor belt 26. The servo motor 4 can drive lift bars 12 and 14, the servo motor 40 can drive spray bars 20 and 22, to orient the components 12, 14, 20, and 22, parallel to the conveyor belt 26 (ninety degree rotation from FIG. 1), or at some other angle, or a one hundred and eighty degree rotation which causes ends 20a and 20b to swap locations and ends 22a and 22b to swap locations.

In at least one embodiment, colorant is sprayed onto a surface, and/or in the cracks of the surface, such as cracks 16 and 18 shown in FIG. 1, of the slab 30 through one or more of nozzles 24 and 25.

The conveyor belt 26 and the roller 28 may be part of an overall conveyor device, and the belt 26 and roller 28 may be driven by a motor not shown in FIG. 1.

Figure 2:
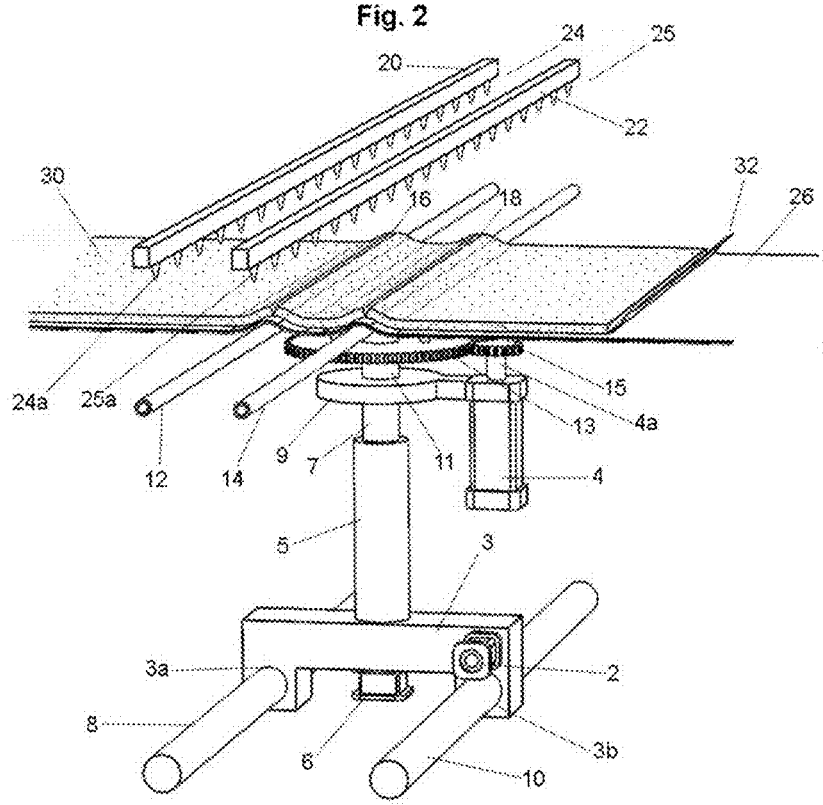
FIG. 2 shows a top, left, and front close up perspective view of a portion of the apparatus of FIG. 1, with part of the apparatus of FIG. 1 visible in FIG. 2, which is not visible in FIG. 1, with the apparatus of FIG. 1 in the first state.

FIG. 2 shows a top, left, and front close up perspective view of a portion of the apparatus 1 of FIG. 1, with part of the apparatus 1 of FIG. 1 visible in FIG. 2, which is not visible in FIG. 1, with the apparatus 1 of FIG. 1 in the first state.

FIG. 3 shows a close up side view of a portion of the apparatus 1 of FIG. 1, with the apparatus 1 of FIG. 1 in the first state.

Figure 4:
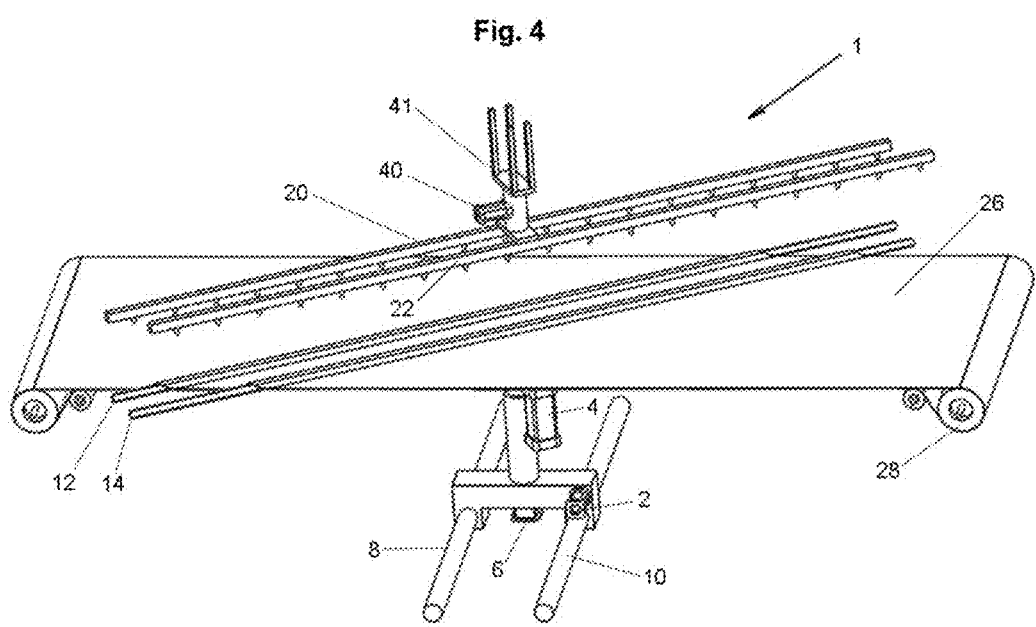
FIG. 4 shows a perspective view of the apparatus of FIG. 1, with the apparatus of FIG. 1 in a second state.

FIG. 4 shows a perspective view of the apparatus 1 of FIG. 1, with the apparatus 1 of FIG. 1 in a second state, in which the lift bars 12 and 14, together with the spray bars 20 and 22 have been driven to be at a substantial longitudinal angle with respect to the conveyor belt 26 by the servo motor 4 and servo motor 40.

Figure 5:
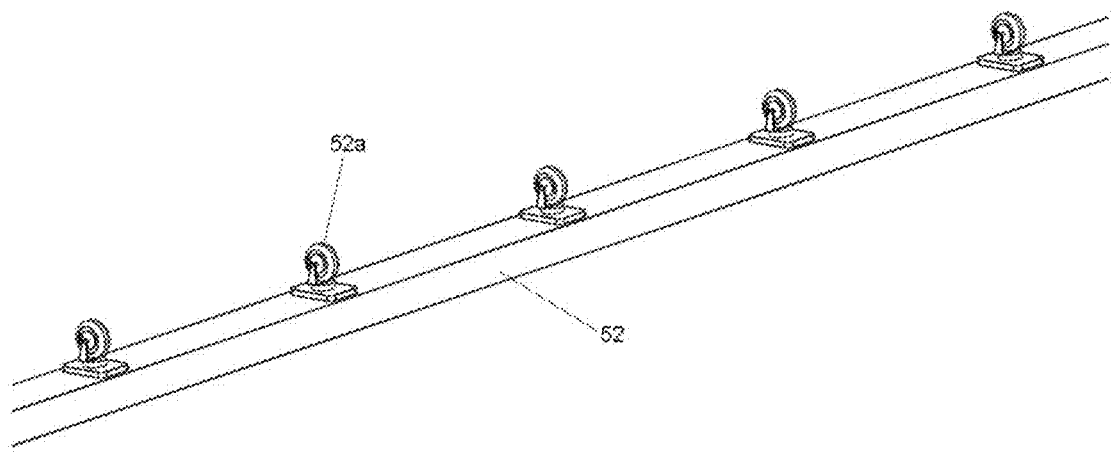
FIG. 5 shows a caster railing which can be used instead of a lift bar in the apparatus of FIG. 1.
Figure 6:
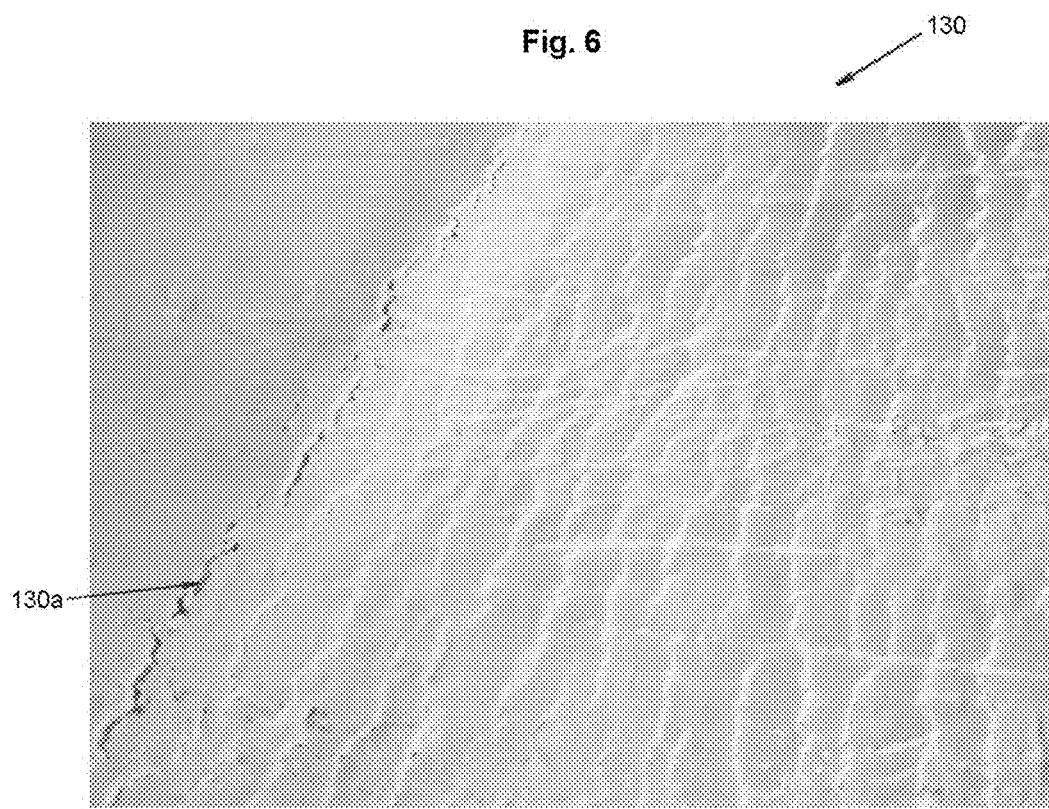
FIG. 6 shows image of a slab with a crack formed in accordance with an embodiment of the present invention.

FIG. 5 shows a caster railing which can be used instead of a lift bar in the apparatus of FIG. 1;

FIG. 6 shows an image of a soft or damp slab 130 (which may be similar to or identical to the slab 30 of FIG. 1) with a crack 130a formed in accordance with one or more embodiments of the present invention.

Figure 7:
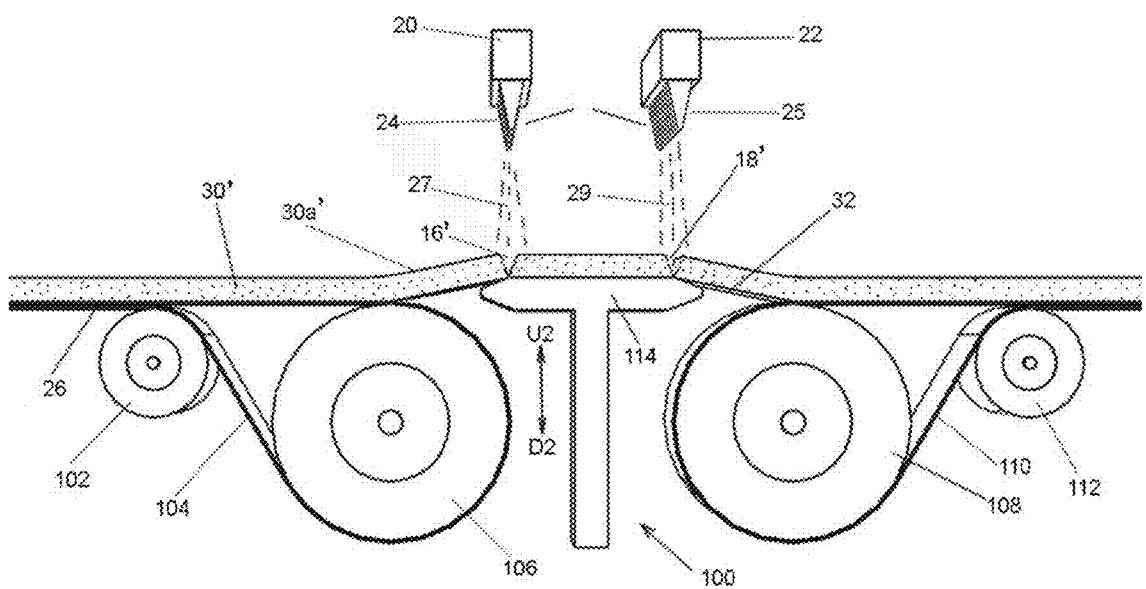
FIG. 7 shows side view wherein someone of the components of the apparatus of FIG. 1, have been replaced.

FIG. 7 is a side view, wherein the components 2, 3, 4, 6, 7, 8, 9, 10, 11, 12, 13, 14, 15, 17, 19, and 21 have been removed and replaced by an apparatus 100 including component 114 which can be adjusted upwards in the U2 direction or downwards in the D2 direction to set at a different height level with respect to surface level of belt 26. This can also cause the passing through quartz slab surface 30a' to crack at a different height point, but the crack lines generally only occur in a direction perpendicular to the conveyor belt moving direction. In FIG. 7, the slab is identified as slab 30', the slab surface as 30a', the cracks as 16' and 18', because the cracks 16' and 18' will be somewhat different from the cracks 16 and 18, and therefore the slab 30' and the slab surface 30a' will be somewhat different from the soft and/or damp and/or wet slab 30 and surface 30a shown in FIG. 1.

In at least one embodiment, the long lift bars 12 and 14 can be driven up in the direction U1, shown in FIG. 3, by servo motor 6 to push up the section of the conveyor belt 26 while a formed soft and damp quartz slab 30 passes through on the conveyor belt 26, causing the quartz slab surface at the points 16 and 18, above the lift bars 12 and 14, respectively, to crack, along the length direction of the lift bars 12 and 14.

Each of the spray bars 20 and 22 contains a series of spray nozzles, 24 and 25, respectively, positioned above the passing quartz slab 30 on the belt 26, controlled by a computer processor 202, and will send bursts of colorant 27 and 29, shown in FIG. 3, onto the cracks 16 and 18 of the quartz slab 30.

In at least one embodiment, the spray bars 20 and 22 are always in a fixed orientation with respect to the lift bars 12 and 14 so that the spray bar 20 is always right above lift bar 12 and the spray bar 22 is always right above left bar 14, driven by servo motor 4 and 40, controlled by computer processor 202.

Generally, in at least one embodiment, if the lift bars 12 and 14 are rotated to a certain degree by servo motor 4, the servo motor 40 is programmed to rotate spray bars 22 and 24 to exactly the same degree in order to line up components 12, 14 with 22, 24, as shown, for example, in FIG. 4, so that in this way, when spraying occurs the color can get into the cracks, such as cracks 16 and 18 as shown in FIG. 3. Generally, it is critical, in at least one embodiment, that components 12, 14 and 22, 24 be controlled, such as by computer processor 202 to be at the same orientation, such as shown in FIG. 4, in order to position spray bar 20 directly above and aligned with lift bar 12, and spray bar 22 directly above and aligned with lift bar 14, so that the series of nozzles 24 directly above lift bar 12, and the series of nozzles 25 directly above lift bar 14 can spray color material, down into cracks caused by lift bars 12 and 14. If spray bar 20 is not aligned with lift bar 12 and spray bar 22 is not aligned with lift bar 14, most of the color material will be sprayed outside of the cracks.

In addition, generally speaking as shown by FIG. 3, cracks 16 and 18 typically occur, in at least one embodiment, when the portion of the slab 30 passes through a different height level, such as for example measured from gear or component 13. Due to lift bar 12, a first portion of the slab 30 is moved upwards out of alignment with the majority of the slab 30. Due to lift bar 14, a second portion of the slab 30 is move upwards out of alignment with the majority of the slab 30, at the same time that the first portion of the slap 30 is moved out of alignment with the majority of the slab 30. After that portion of the slab 30 passes through that different height level, for example after a portion of the slab 30 passes lift bar 12, the crack 16 will close. Similarly after a portion of the slab 30 passes lift bar 14, the crack 18 will close. The spraying color material into the cracks 16 and 18, generally is programmed to occur when the cracks 16 and 18 occur, not after.

In at least one embodiment of the present invention, a different height level causes a portion of a formed quartz slab surface 30a to crack at a different height level point, while a crack exists, color material is sprayed into the cracks, such as 16 and 18. The spraying of color material can be done by a human with a spray gun, or by a spray bar or bars, such as 20 and 22, as described in this invention, or by robot with a way to detect crack area and spray into cracks.

In addition, the direction of crack lines, such as lines 16 and 18 can be controlled by the rotatable lift bars 12 and 14 in one or more embodiments of the present invention.

The lift bars 12 and 14 are sitting on top of members 19 and 21, which are connected to gear 13, and which can cause the lift bars 12 and 14 to rotate to a certain direction as desired, from zero to one hundred eighty degrees, driven by a servo motor 4 and controlled by the computer 202. The lift bars 12 and 14 can be raised when cracks in certain area of the surface of a passing through quartz slab on belt are needed, and at the same time when the cracks occur, the colorant is sprayed into the cracks, such as shown for cracks 16 and 18, with colorant 27 and 29 shown in FIG. 3, controlled by computer processor 200.

In general, the higher the lift bars 12 and 14 are raised, the wider the cracks 16 and 18 on the surface of 30a of the passing through quartz slab 30 will be, and therefore when sprayed, the deeper the colorant 27 and 29 on the inner walls, such as 16a and 18a of the cracks 16 and 18, will penetrate, and the denser of the colorant 27 and 29 on walls, such as 16a and 18a of cracks 16 and 18 will be. I.e. typically more penetration means darker and deeper crack veins.

When a substantial longitudinal direction (along the length of the slab 30) crack veins in a quartz slab are needed, the bars 12 and 14 are rotated to that orientation, such as shown in FIG. 4, and the bar structure, including bars 12 and 14, can be moved on tracks or rods 8 and 10, so it can be moved in and out underneath the conveyor belt 26 to be positioned at desired area. If more crack lines are needed in the longitudinal direction, the conveyor belt 26 can be stopped, in response to the computer processor 202, and the lift bar structure, including bars 12 and 14, can continue to move on tracks 8 and 10 to a desired area and colorant can be sprayed into cracks above the lift bars in the manner previously described.

Lift bars 12 and 14 can be equipped with bearings, so it can have less resistance when raised against the moving conveyor belt 26. For example, in FIG. 5, a caster railing 52 can be used as a lift bar, instead of lift bar 12, to achieve the same result. In such an embodiment, the circular cross section of the caster wheel 52a of the caster railing 52 can be replaced in substituted in FIG. 3 for the circular cross section of the bar 12.

FIG. 7 shows an apparatus 100 which replaces various components shown in FIG. 3. The apparatus 100 may include a junction plate 114, a first belt structure including belt 104 and rollers 102 and 106, and a second belt structure including belt 110, and rollers 108 and 112. By adjusting the junction plate 114, up and down in the directions U2 and D2 between two separate belt structures different height levels with respect to the surface level of a moving conveyor belt 26, this also causes, in at least one embodiment, the passing through formed quartz slab surface 30a above the junction plate 114 area to crack, but the crack lines are substantially only in the cross direction of the moving belts 104 and 110 or moving quartz slab 30. Any height difference may cause the passing through slab 30 surface to crack at the height different point, and colorant may be sprayed into the cracks 16' and 18' at the same time.

FIG. 4 shows lift bars 12 and 14 and spray bars 20 and 22 in a diagonal orientation with respect to a length of the conveyor belt 26, wherein the conveyor belt 26 has a width which is substantially less than its length.

Once the entire formed quartz slab passed the lift bar area and desired area of crack lines created and colorant sprayed into the desired section of the (the on-off of all nozzles on the spray bars 20 and 22 can be controlled separately if needed) cracks, the quartz slab 30 is transferred to a vacuumed press machine. When the press machine is lowered onto the quartz composite material 30, the cracks 16 and 18 (or 16' and 18') sprayed with colorant will become lines of the colorant in the quartz slab that simulate veins in natural stone on the surface of the slab after the slab 30 has been cured, grinded, and polished.

Figure 8:
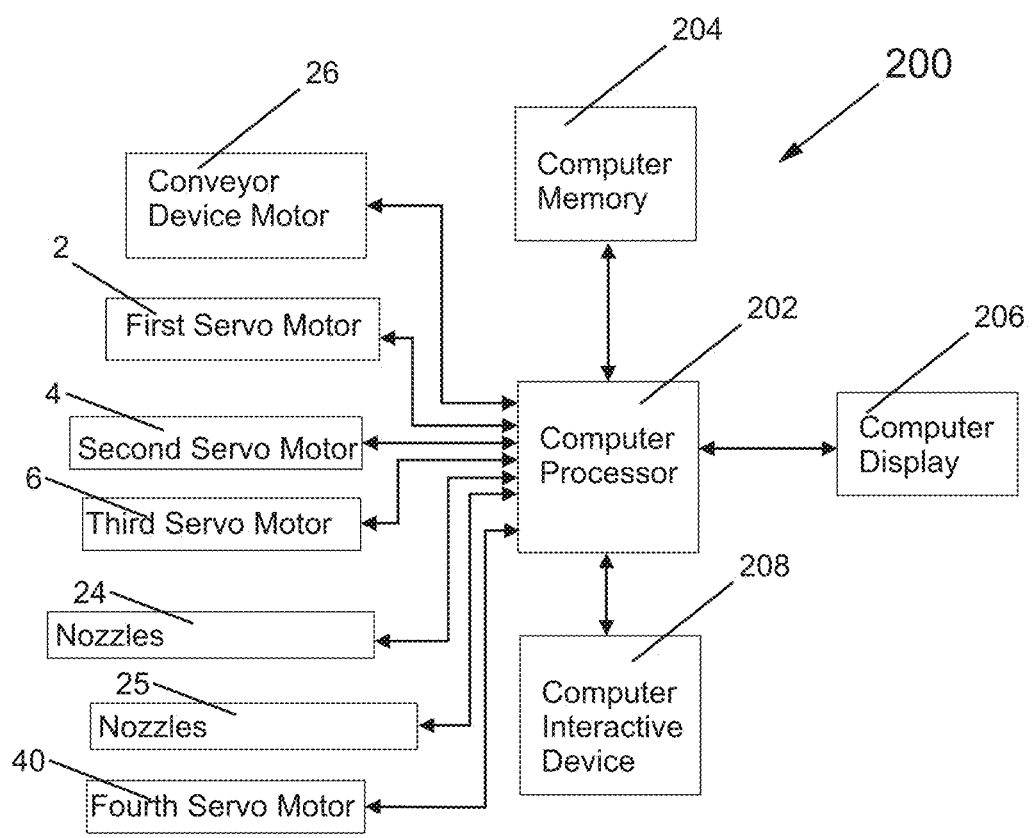
FIG. 8 shows a simplified block diagram of a computer processor and components which communicate with and/or are controlled by the computer processor.

FIG. 8 shows a simplified block diagram 200 including a computer processor 202 and components communicating with and/or controlled by the computer processor 202.

Referring to FIG. 8, the diagram 200, shows a computer processor 202, a computer memory 204, a computer display 206, a computer interactive device 208 (such as a computer mouse, touchscreen, or computer keyboard), and in simplified block diagram form, the conveyor device motor for conveyor belt 26, the first servo motor 2, the second servo motor 4, the third servo motor 6, the nozzles 24, and the nozzles 25. The computer processor communicates with and controls the components 26, 2, 4, 6, 24, and 25, as well as components 204, 206, and 208.

In operation, the computer processor 202 is programmed by computer software stored in the computer memory 204, and/or controlled by the computer interactive device 208 to control the components 26, 2, 4, 6, 24, 25, 24a, and 25a.

In one or more embodiments, spray bars 20 and 22 may be replaced by a human hand with a spray gun, in order to add randomness in missing some of the crack area, wherein said randomness may be desired. In other embodiments, a robot sprayer with a photo sensor may replace spray bars 20 and 22, wherein the photo sensor is used to spot or detect cracks and spray in the cracks as desired. There may be other ways to spray into the cracks.

Even though the rotation of the lift bars 12 and 14 are shown in one or more embodiments, as driven by servo motor 4 and controlled by computer processor 202, in alternative embodiments, the rotation of lift bars 12 and 14 can occur by hand.

Even though the up and down movement of FIG. 1, of the member 7 in FIG. 2 is driven by servo motor 6 and controlled by the computer processor 202 in one or more embodiments, in alternative embodiments, the up and down movement of the member 7 can be implemented manually, such as by a hand jack.

Even though the device including member 3, move in directions D1 and D2, in at least one embodiment, as shown in FIG. 1, driven by servo motor 2 and controlled by the computer 202, the member 3, and components fixed thereto can be rolled in the directions D1 and D2, shown in FIG. 1, in alternative embodiments by hand.

Figure 9:
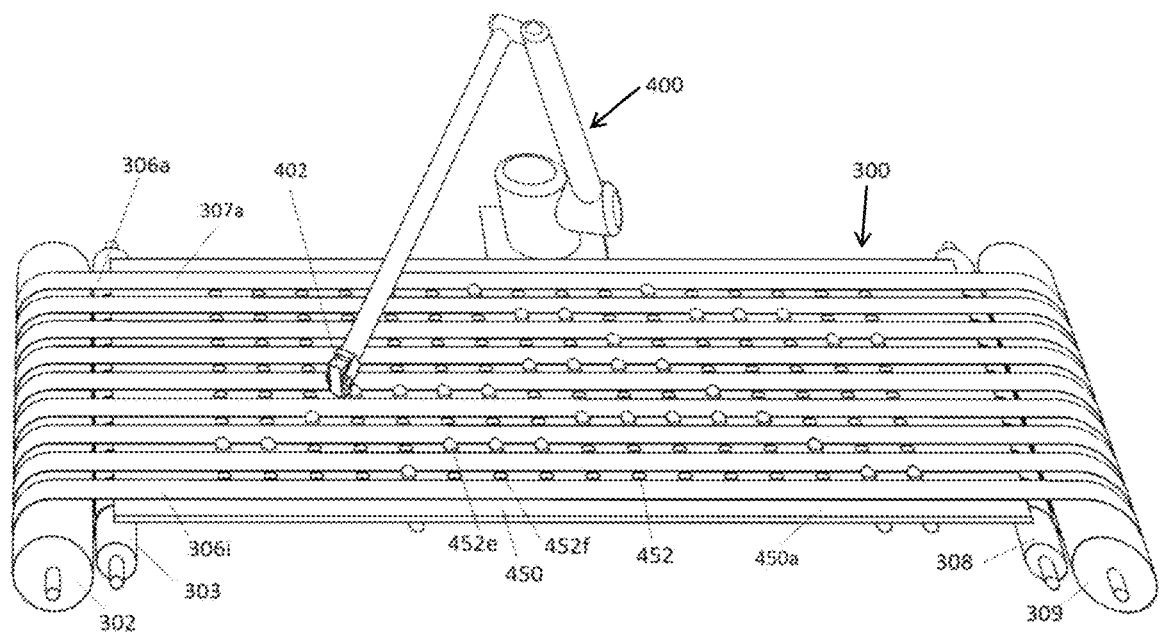
FIG. 9 shows a perspective view of a robotic apparatus, a spraying device, a plate with a matrix of openings in accordance with an embodiment of the present invention, a matrix of cylinders and holes, and an apparatus for conveying a slab, without the slab shown.

FIG. 9 shows a perspective view of a robotic apparatus 400, a material spraying or depositing device 402 and part of the conveyor apparatus 300, which includes rollers 302, 303, 308 and 309. The conveyor apparatus 300 includes a plurality of belts 306a-306i, shown in FIG. 16, each of which may be parallel to all of the other belts of 306a-i. There are grooves on rollers 302 and 309 in order to keep the belts in alignment during movement. FIG. 9 also shows a plate 450, which has a plurality of openings 452. Some of the openings 452, such as opening 452e, shown in FIG. 9, are shown with a raised cylinder, and other openings, such as opening 452f, are shown without a raised cylinder.

Figure 17:
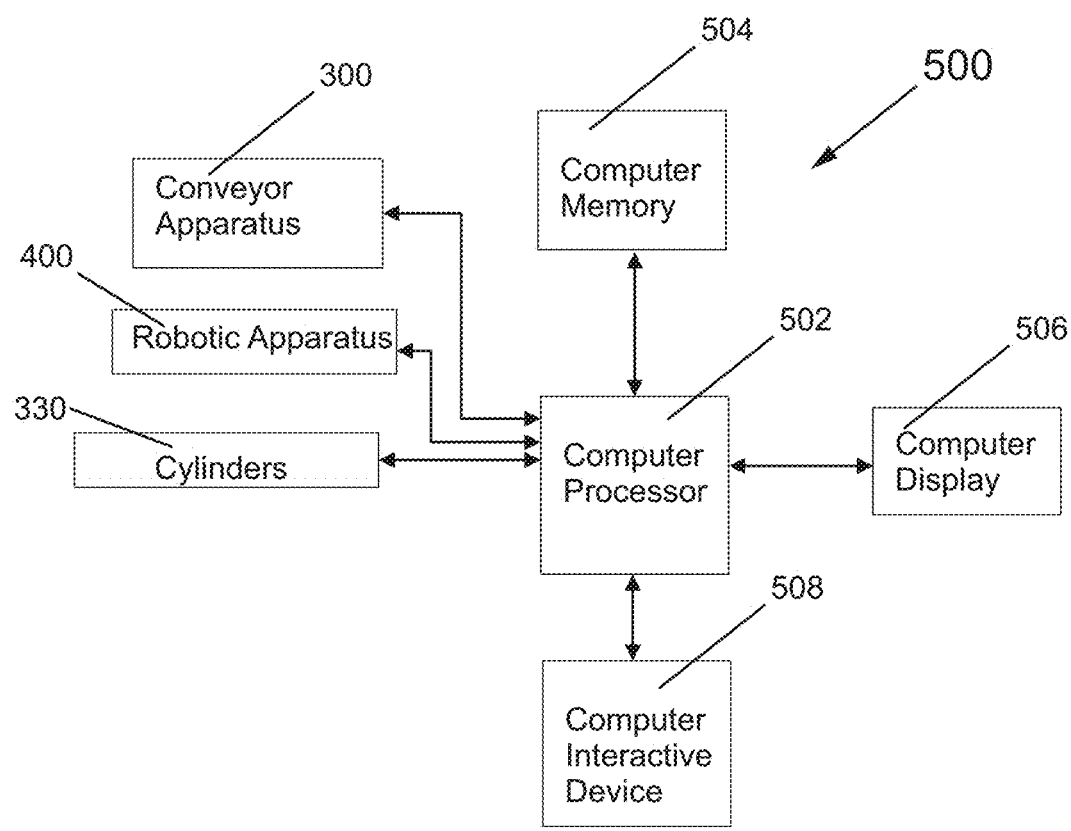
FIG. 17 shows a simplified block diagram of a computer processor and components which communicate with and/or are controlled by the computer processor.

FIG. 17 shows a simplified block diagram 500 of a computer processor 502 and components which communicate with and/or are controlled by the computer processor 502. The computer processor 502, computer memory 504, computer display 506, and computer interactive device 508 may be similar or identical to the components 202, 204, 206, and 208 previously described with respect to FIG. 8, except as described in this application.

The computer processor 502 may control the conveyor apparatus 300, the robotic apparatus 400 (which may include the spraying device 402), and a plurality of cylinders 330. The plurality of cylinders 330 may include a matrix of a plurality of cylinders corresponding with and aligned with the matrix of a plurality of openings 452. The cylinders 330 may include cylinders 330a-p shown in FIG. 12.

Figure 10:
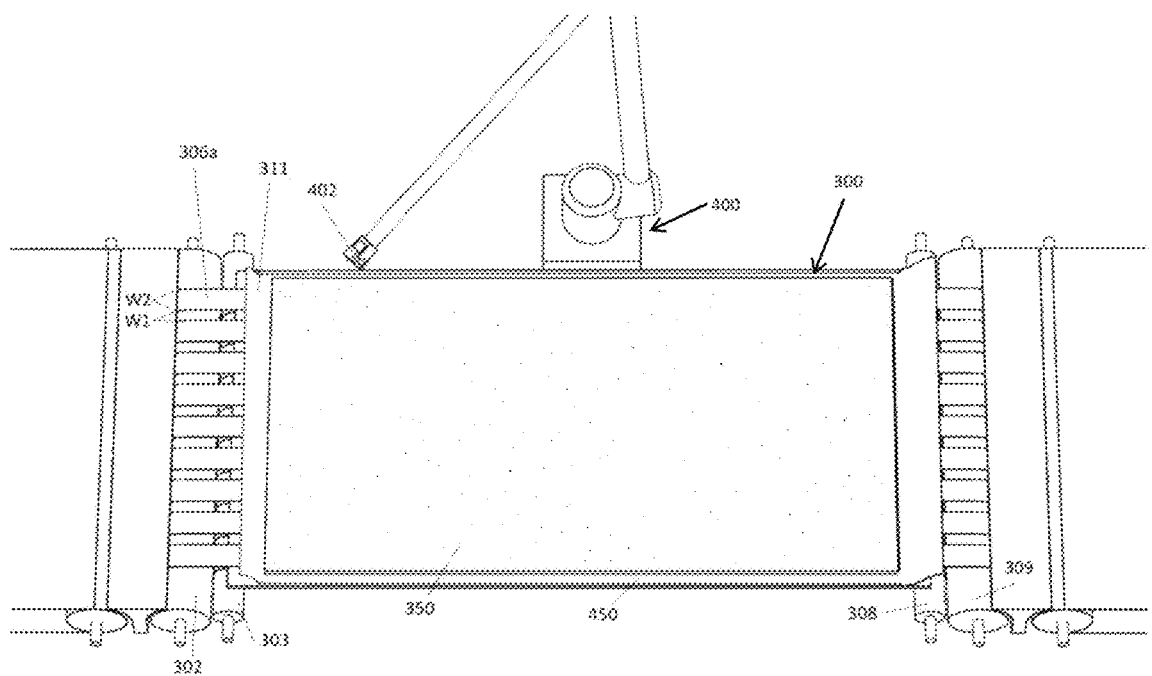
FIG. 10 shows a perspective view of the robotic apparatus, the spraying device, the slab, the sheet, the plate covered by the slab, and the apparatus for conveying the slab.

The robotic apparatus 400 may be any known robotic apparatus which is controlled by computer processor 502, in accordance with a computer program stored in computer memory 504 to move the spraying device 502 to any location above the plate 450 and simultaneously within a perimeter of the plate 450, shown in FIG. 10, and consequently above the slab 350 and within the perimeter of the slab 350 when the slab 350 overlaps the plate 450 as shown in FIG. 10.

The conveyor apparatus 300 may be controlled by the computer processor 502, as programmed by computer software stored in the computer memory 504. The cylinders, and specifically the movement of the cylinders up and down, the height of the cylinders or distance, and/or whether a particular cylinder, such as cylinder 330f, protrudes through and above an opening of the plate 450, are controlled by the computer processor 502 as programmed by computer software stored in computer memory 504.

Figure 12:
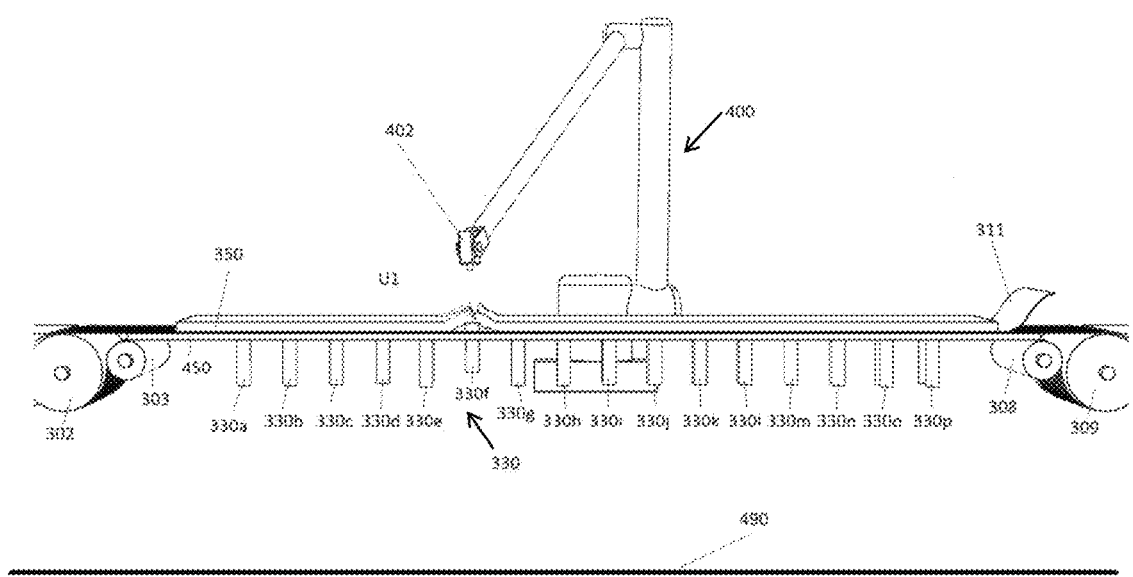
FIG. 12 shows a front view of the robotic apparatus, the spraying device, the slab, the sheet, the plate covered by the slab, and the apparatus for conveying the slab with one cylinder raised, causing one or more cracks to form in the slab above.

Each of cylinders 330a-p may be a solid cylinder. In FIG. 12, except for cylinder 330f, the other cylinders of 330a-p do not protrude above the top surfaces of the belts 306a-306i, such as top surface 307a of the belt 306a. The top surfaces of the belts 306b-i, typically are at the same height level or distance above the top surface 450a of the plate 450.

If all of cylinders 330a-p are below the top surface 307a (and the other top surfaces of belts 306b-i) then the slab 350 passes over the region of the plate 450, without any additional cracks being generated.

However, when a cylinder 330f protrudes above the top surface 307a of the belt 306a (and thus above the top surfaces of the belts 306b-306i), the slab 350 is pushed upwards in the direction U1, shown in FIG. 12, at that location, to cause one or more cracks to occur in the slab 350.

As shown in FIG. 9, there are gaps between adjacent belts of the belts 306a-306i, which permit one or more of the cylinders 452 to protrude through the gaps between adjacent belts, and to thus push up the slab 350 in the direction U1, at particular locations.

In at least one embodiment, the belts 306a-i are preferably parallel to each other and the gaps between adjacent belts of belts 306a-i, preferably have the same width, W1 shown in FIG. 10.

Figure 14:
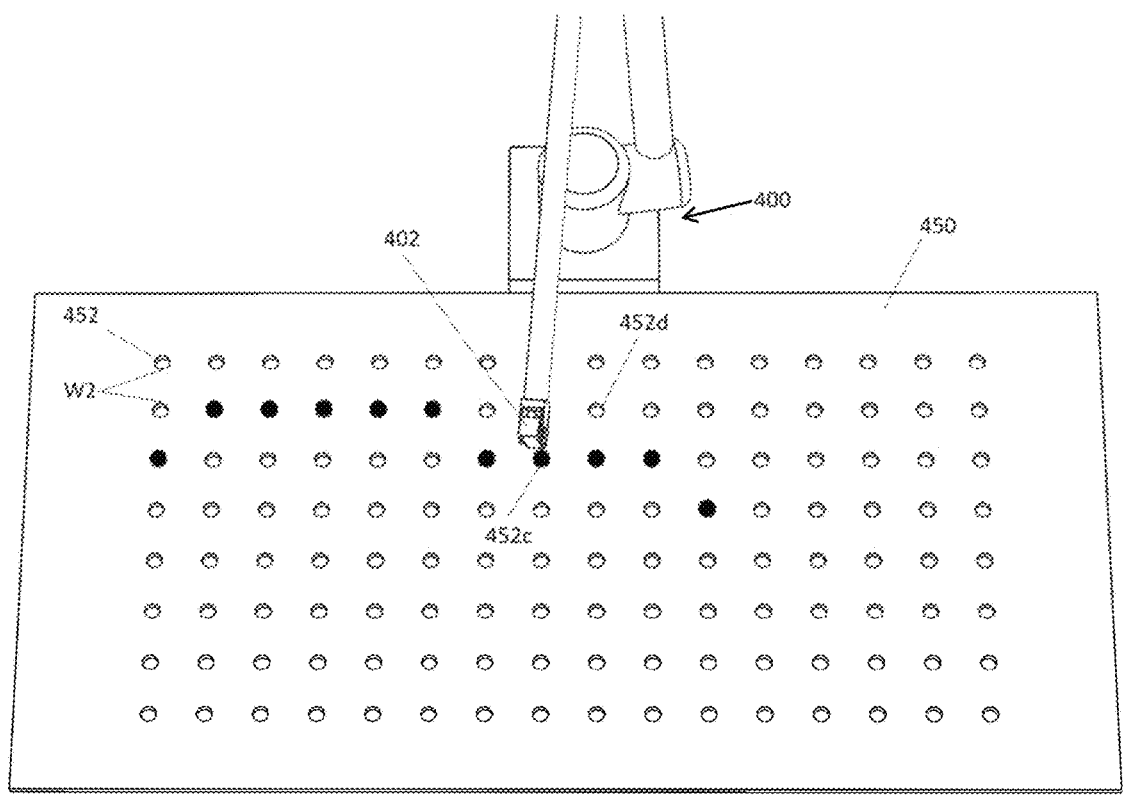
FIG. 14 shows a perspective view of the robotic apparatus, the spraying device, and the plate, with different openings shown darkened indicating raised cylinders and others shown not darkened indicating lowered cylinders, in a second state for the plurality of cylinders, which is different from FIG. 13.

In at least one embodiment, the openings 452 shown in FIG. 14 are arranged in a matrix with a plurality of rows and a plurality of columns. The distance between adjacent rows of the openings 452 is about the width W2 of one of the belts 306a-306i, wherein each of the belts 306a-i, typically has the same width W2.

FIG. 10 shows a perspective view of the robotic apparatus 400, the spraying device 402, and the conveyor apparatus 300, which have been previously described, as well as a slab 350 and a sheet 311 which have been moved into position to be processed on top of the plate 450.

Figure 11:
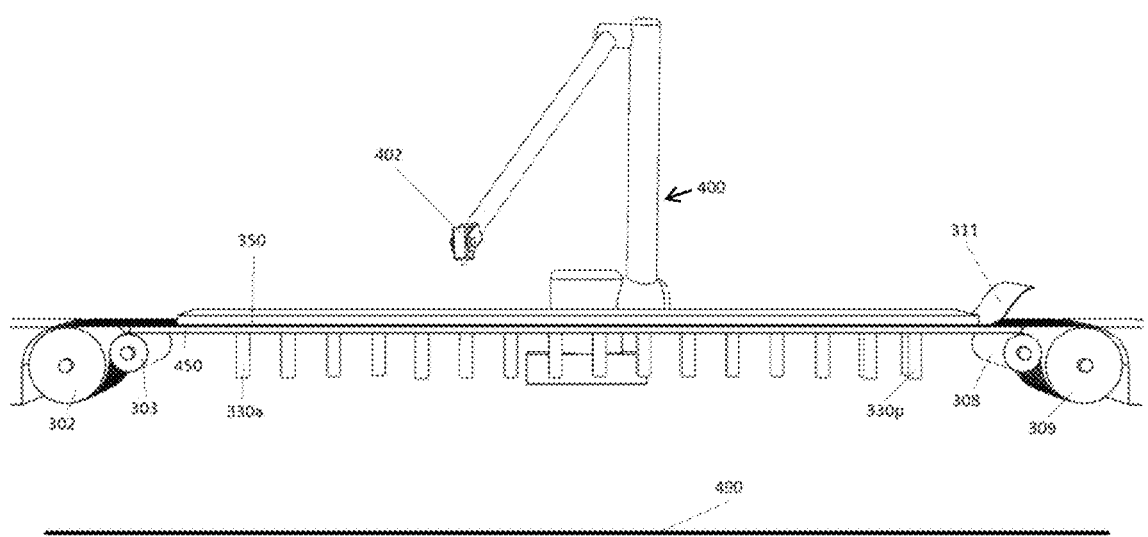
FIG. 11 shows a front view of the robotic apparatus, the spraying device, the slab, the sheet, the plate covered by the slab, and the apparatus for conveying the slab, with all cylinders in their lowered positions.

FIG. 11 shows a front view of the robotic apparatus 400, the spraying device 402, the conveyor device or apparatus 300, the slab 350 and the sheet 311 in position to be processed on top of the plate 450. FIG. 11 shows cylinders 330a-330p, all in a lowered state.

FIG. 12 shows a front view of the robotic apparatus 400, the spraying device 402, the conveyor device or apparatus 300, the slab 350 and the sheet 311 in position to be processed on top of the plate 450. FIG. 12 shows cylinders 330a, 330b, 330c, 330d, 330e, 330f, 330g, 330h, 330i, 330j, 330k, 330l, 330m, 300n, 300o, and 330p, with only cylinder 330f raised so that its leading top edge or top surface is above the top surface 307a of the belt 306a, and the corresponding top surfaces of the belts 306b-306i. This causes the sheet 311 and the slab 350 to also rise at the location of cylinder 330f, causing cracks and fissures to form on the top surface of slab 350 above and around cylinder 330f.

Figure 13:
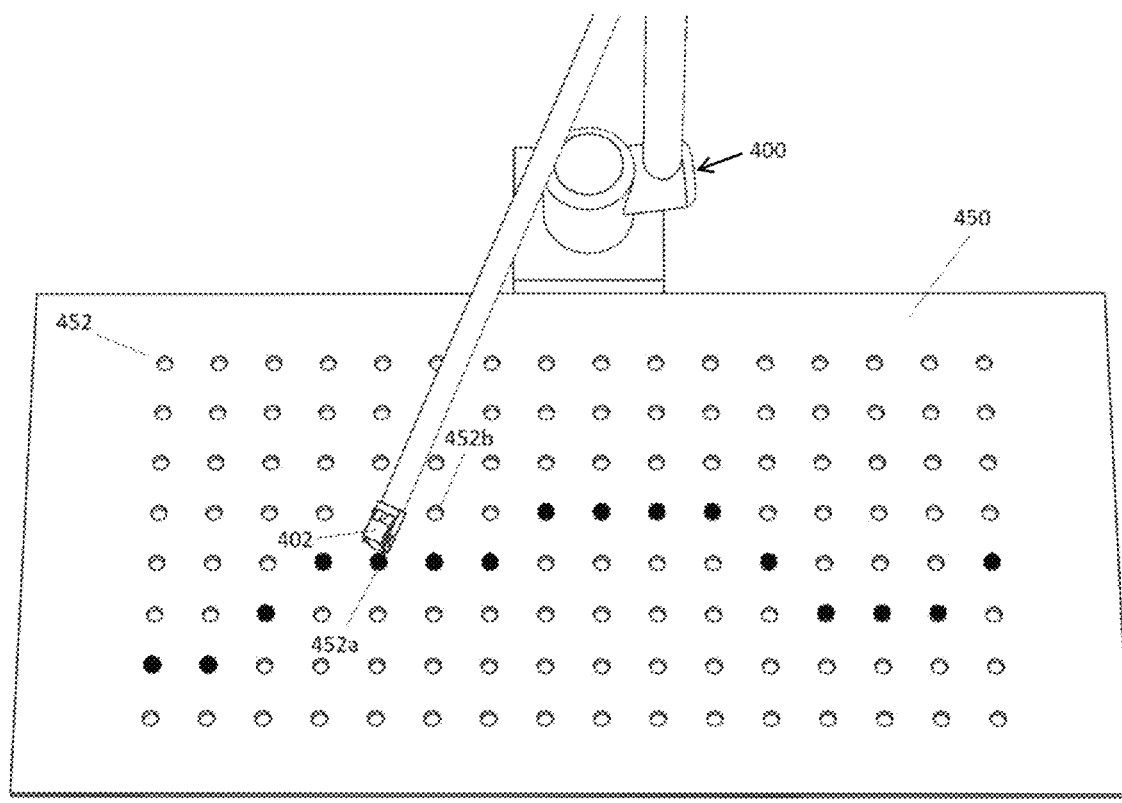
FIG. 13 shows a perspective view of the robotic apparatus, the spraying device, and the plate with the matrix of openings in accordance with an embodiment of the present invention, with specific openings of the plate shown darkened indicating raised cylinders and others shown not darkened indicating lowered cylinders in a first state for the plurality of cylinders.

FIG. 13 shows a perspective view of the robotic apparatus 400, spraying device 402 and the plate 450. The plate 450 has a plurality of openings 452. Some of the openings 452, such as opening 452a are shown darkened to represent a raised cylinder, of cylinders 330a-p, above the top surface 307a of the belt 306a and above the top surfaces of other belts 306b-i similar or identical to cylinder 330f shown in FIG. 12, and some of the openings 452, such as opening 452b are shown not darkened to represent a lowered cylinder, similar or identical to what is shown for cylinders 330a-i except 330f, in FIG. 12, which are below the top surface 307a of the belt 306a and below the top surfaces of the other belts 306b-306i. Not shown in FIG. 13 are conveyor device or apparatus 300, sheet 311 and slab 350 which generally would be on top of the plate 450. In this first state of cylinders 330a-p, a plurality of raised cylinders is caused by the computer processor 502 in order to form cracks or fissures in slab 350 according to a desired final design. Once the cracks or fissures are created, spraying device 402 attached to a robotic arm of the robotic apparatus 400 is controlled by computer processor 502, as programmed by computer software in the memory 504 to deposit dye or colored material on top of the formed cracked or fissured area. After the dye or colored material is deposited, all of the cylinders 330a-p are controlled by the computer processor 502 to return to a lowered state, below the top surfaces of the belts 306a-i.

In at least one embodiment, for the matrix of the plurality of openings 452 there is an aligned matrix of a plurality of corresponding cylinders, similar or identical to cylinders 330a-p. For example, if there are eight rows and sixteen columns for a rectangular matrix of openings 452, then there would be, in a least one embodiment, an aligned eight rows and sixteen columns of a rectangular matrix of cylinders, each cylinder similar or identical to cylinder 330a.

FIG. 14 shows a perspective view of the robotic apparatus 400, the spraying device 402, and the plate 450 shown in FIG. 13. FIG. 14 differs from FIG. 13, in that different cylinders are raised, and therefore shown darkened. For example, a cylinder corresponding to opening 452c is raised, through opening 452 and protrudes above the surface 307a of the belt 306a, and above surfaces of the other belts 306b-l, and a cylinder corresponding to opening 452d is not raised above the surface 307a. In the second state a different plurality of raised cylinders compared to the first state of FIG. 13, is caused by the computer processor 502, in order to form additional and different cracks or fissures in slab 350 according to a desired design. Once the cracks or fissures are created, spraying device 402 attached to the robotic arm apparatus 400, is controlled by the computer processor 502 to deposit dye or colored material on top of the formed cracked or fissured area. After the dye or colored material is deposited, all of the cylinders of 330a-p, or similar or identical cylinders are returned to a lowered state by the computer processor 502 below the top surface 307a of the belt 306a and corresponding top surfaces of the belts 306b-i.

Figure 15:
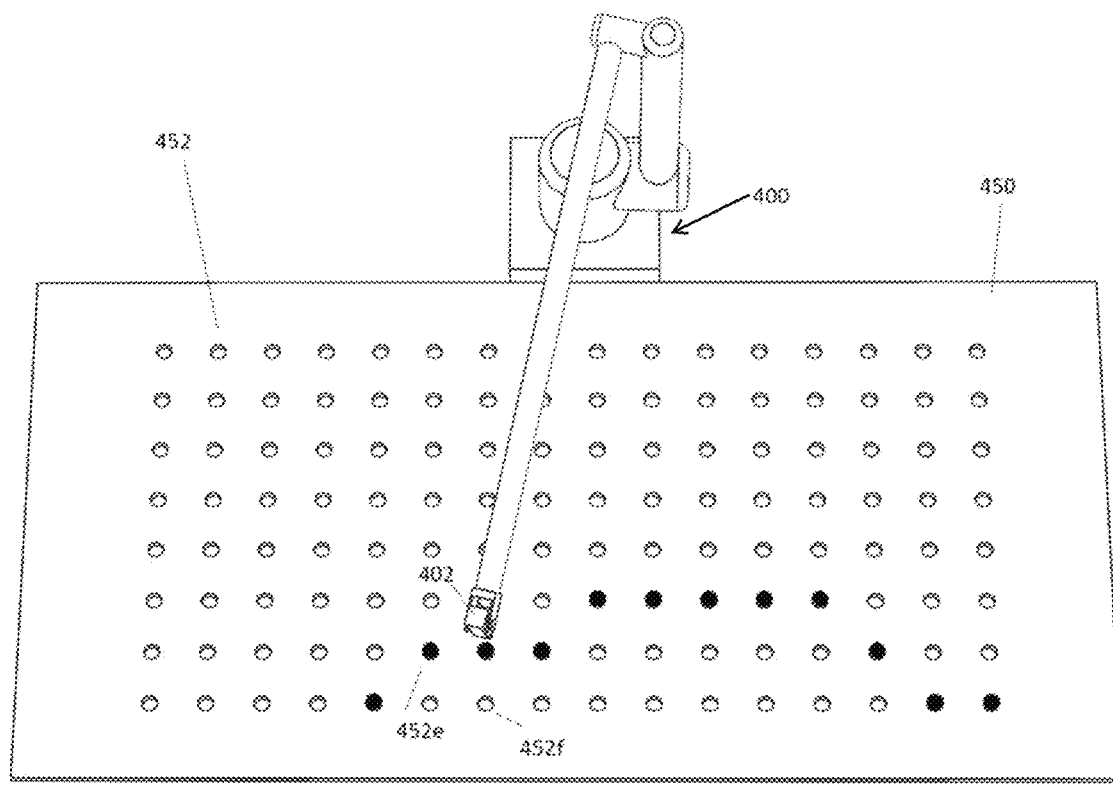
FIG. 15 shows a perspective view of the robotic apparatus, the spraying device, and the plate, with different openings shown darkened indicating raised cylinders and others shown not darkened indicating lowered cylinders in a third state for the plurality of cylinders, which is different from FIGS. 13 and 14.

FIG. 15 shows a perspective view of the robotic apparatus 400, the spraying device 402, and the plate 450 shown in FIG. 13. FIG. 15 differs from FIG. 13 and FIG. 14, in that different cylinders, of cylinders 330a-p are raised, shown darkened. For example, a cylinder corresponding to opening 452e is raised, above the top surface 307a of the belt 306a, and above the top surfaces of belts 306b-i and a cylinder corresponding to opening 452f is not raised above the top surface 307a of the belt 306a. In the third state of FIG. 15, a different plurality of raised cylinders of cylinders 330a-p compared to the first and second states, is caused by the computer processor 502 in order to form additional and different cracks or fissures in the slab 350 according to a desired final design. Once the cracks or fissures are created, the computer processor 502 is programmed to cause spraying device 402 attached to the robotic arm apparatus 400 to deposit dye or colored material on top of the formed cracked or fissured area. After the dye or colored material is deposited, all of the cylinders, such as 330a-p are returned to a lowered state, so they do not protrude above the top surface 307a of the belt 306a or any of the other top surfaces of the belts 306b-i.

Figure 16:
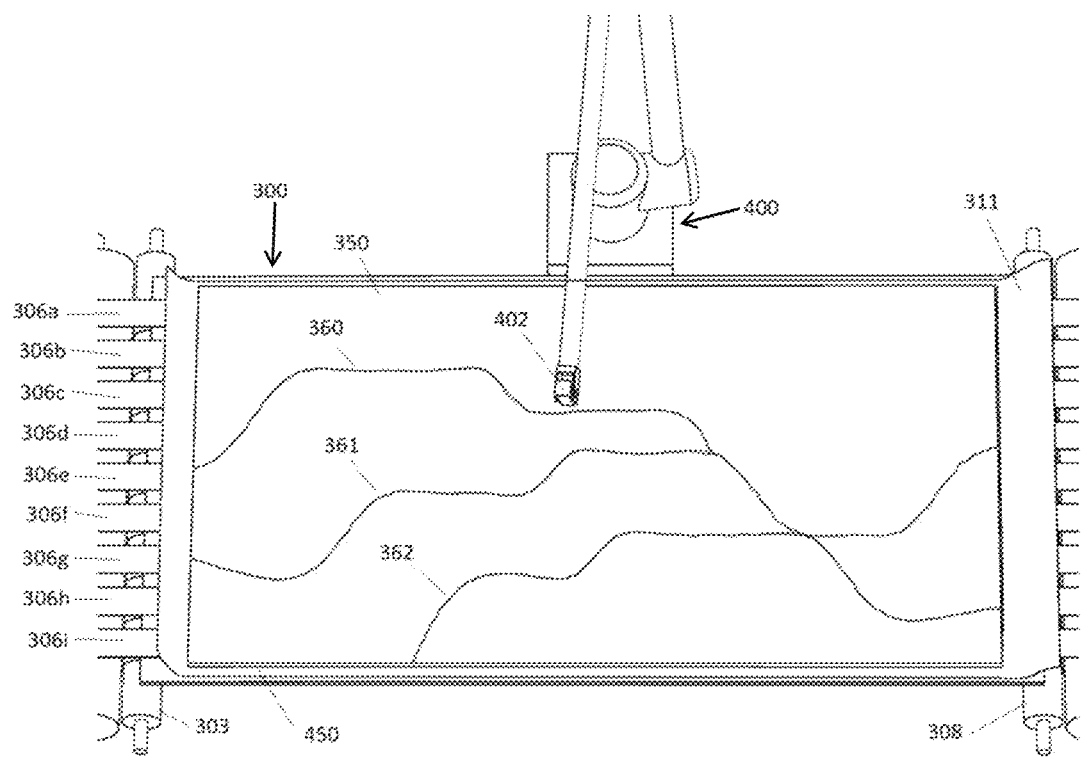
FIG. 16 shows a perspective view of the robotic apparatus, the spraying device, a slab that has been processed through the first three states of FIGS. 13-15 to a fourth and final state, the sheet, the plate covered by the slab, and a portion of an apparatus for conveying the slab.

FIG. 16 shows a perspective view of the robotic apparatus 400, spraying device 402, the slab 350, sheet 311, and conveyor device 300. The slab 350 has been processed through the above first, second and third states for the cylinders. Lines or veins 360, 361 and 362 are formed during states the second, first, and third states for the cylinders, respectively.

In accordance with a method in one or more embodiments of the present invention, particulate quartz, resin and other additives are mixed into a damp mixture and evenly distributed into a mold tray with or without a bordering frame. The damp mixture is deposited on top of a paper like sheet 311. The length and width of this mixture formation or slab 350, can vary.

The damp mixture formation or slab 350 is slightly pressed on the top by a roller or by a flat plate. This slightly compacts the mixture formation into a consistency similar to damp soil.

The slightly pressed mixture formation or a slab 350 is transported via a conveyor apparatus 300, such as by belts 306a-i moved by roller 302 in FIG. 9, until the slab 350 is overlapping the plate 450, and generally completely within and/or encompassed by the perimeter of the plate 450. The plate 450 has an array of holes or openings 452. This conveying action may be accomplished in a variety of methods not shown in the figures such as a device grasping the sheet 311 and dragging it onto the plate 450, and out of the plate 450 after it has been processed. Through these holes 452, cylinders, such as cylinders 330*a-p*, which may be air, hydraulic, electric magnetic, or other kind of cylinders, or the like may be controlled to rise or drop perpendicular to the plane in which the slab 350 is sitting on. These cylinders 330*a-p* are controlled by the computer processor 502, shown in FIG. 17, and may be raised independently, with different forces and varying distances. Although only one row of cylinders 330*a-p* are shown in FIG. 12, in at least one embodiment, there would typically be a matrix of a plurality of rows by a plurality of columns, so that there is one cylinder for each of the openings 452 of the plate 450.

By controlling the rise of certain cylinder or cylinders (or first group of cylinders) of the cylinders 330*a-p* or similar cylinders corresponding to the matrix of holes 452, through the holes 452 of the plate 450, each cylinder pushes up on the bottom of the slab 350 through the sheet 311. This causes the top surface of the mixture formation above the cylinders 330*a-p* or similar cylinders to crack and fissure. Since the cylinders 330*a-p*, and similar cylinders, are controlled by computer processor 502, in accordance with computer programming stored in computer memory 504, the resultant cracks and fissures will have a certain level of controlled randomness. This controlled randomness is desired by design.

Once the pattern of cracks and fissures have formed, a different color of dye or quartz and resin mixture in liquid, powder, or small particle form can be placed, deposited, sprayed, or in combination, onto the surface of the mixture formation over the cracked areas by spraying device 402 of the robotic apparatus 400. The different color of dye or quartz and resin mixture in liquid, powder, or small particle form may be placed, deposited, sprayed, such as by device 402 of the robotic apparatus 400 or in combination, onto the surface of the mixture formation over the second pattern of the cracked areas through the control of the computer processor 502. At this point, the first group of cylinders that formed the first pattern of cracks and fissures can be dropped or lowered in height through control of the computer processor 502.

At this time, the second group of cylinder or cylinders of 330*a-p* or similar cylinders of a matrix may be raised through control of the computer processor 502, and the second set of corresponding cracks and fissure on the surface of the mixture formation will occur. A different color of dye or quartz and resin mixture in liquid, powder, or small particle form is then deposited by spraying device 402.

The above process may be repeated until the final designed pattern is created.

A second color of dye or quartz and resin mixture, which could be different from the slab 350 and different from the first color of filling material could be used if needed. The spraying device 402 may be supplied with solid, liquid or gaseous material depending on the desired aesthetic. A variety of methods for supplying the spraying device 402 exist, including but not limited to air hosing, tubing, or storage tanks.

The width of the cracks and fissures can be partially controlled by raising the cylinders 330*a-p* and similar cylinders of a matrix to varying heights, and by deposit different amount of dye or colored material on the cracked areas. This will allow for the control of the width and depth of the resultant veins.

Once finished, the entire slab 350, as modified, is moved by the conveyor apparatus 300, into a vibrating, vacuumed heavy-duty press machine. Once it is pressed, the slab 350 is moved to a curing machine. After curing, the slab is trimmed and ground down to desired size then polished to reveal the finished, veining patterned slab.

In at least one embodiment, the present invention can raise certain points of the slab 350 through an array of cylinders 330*a-p* and similar cylinders of a matrix. A robotic apparatus 400 controls a spray device 402 which deposits or sprays colorant in liquid, powder or quartz and resin mixture in particle form, in any area of the plane in coordination with the group of the raised cylinders of cylinders 330*a-p*

The plurality of cylinders 330 by themselves or in combination the plate 450 and/or in combination with other components may be considered a device which moves a first portion of a slab out of alignment with a majority of the slab and thereby introduces a first crack in the slab. The plurality of cylinders 330 and the plate 450 may be replaced by a physical structures having other shapes, for example the cylinders 330 may be replaced by a plurality of rectangular solids. The plurality of cylinders 330 may be considered a device which applies pressure to a slab at one or more locations. Each of the openings 452 of the plate 452, in a least one embodiment, is circular and has a diameter which is approximately equal to, or slightly larger than the diameter of each of the cylinders 330, to allow each of the cylinders to move upwards in the direction U1 through their corresponding opening of openings 452 and then move downwards opposite the direction U1, when the particular cylinder of cylinders 330 retracts.

A variety of methods may be used to control the movement of the spray device 402. In the described embodiment a six axis robotic arm is used, however there are many other methods including but not limited to gantry structure devices with spray or delivery device 402 controlled by a computer processor.

Figure 18:
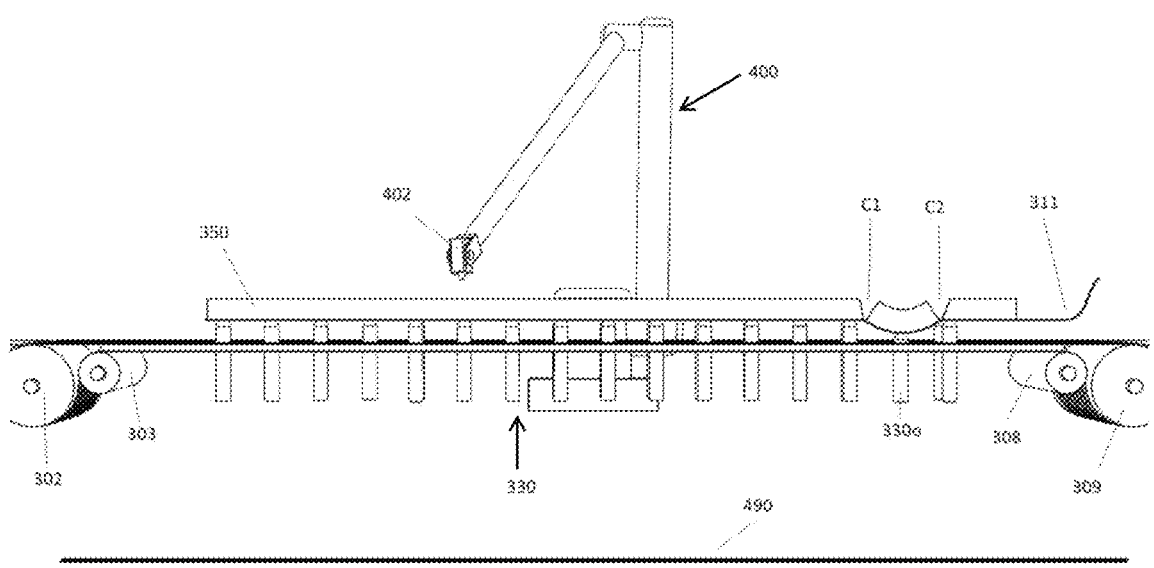
FIG. 18 shows a front view of the robotic apparatus, the spraying device, the slab, the sheet, the plate covered by the slab, and part of the apparatus for conveying the slab, with all cylinders except one cylinder, extended above the plate, so that the slab rests on the cylinders and not on the plate, and cracks are introduced as a result of one cylinder being lowered.

In at least one embodiment of the present invention, the cylinders 330 may be all raised beyond the top surface 307*a* of the belt 306*a*, except for cylinder 330*o* (or some other cylinder), which may be lower than the rest of the cylinders 330 as shown in FIG. 18, before the slab 350 is placed on the cylinders 330. After the cylinders 330 are placed in the configuration of FIG. 18, then the slab 350, can be placed onto the tops of the cylinders 330, by simply dropping the slab 350 onto the cylinders (i.e. the conveyor apparatus 300 may not be used, or some other apparatus for conveying may be used). When the slab 350 is dropped onto the cylinders 330, with the cylinders arranged as in FIG. 18, cracks C1 and C2 will be introduced at the location where 330*o* is lowered.

The plurality of cylinders 330 may all initially be at their highest height, with respect to a ground surface 490. After the slab 350 is lowered onto the plurality of cylinders 330, one or more of the cylinders 330 may be selectively lowered by the computer processor 502 to introduce cracks into the slab 350, similar or identical to cracks C1 and C2 shown in FIG. 18.

The ground surface 490 is shown in FIGS. 11, 12, and 18.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method comprising
causing a first portion of a slab to move vertically out of alignment with an area of the slab surrounding the first portion of the slab and thereby introducing a first crack in the first portion of the slab by using a first device located between the first portion and a ground surface to cause a force to be applied to the first portion of the slab; and
depositing a first material having a color into the first crack of the slab, so that the first crack with the deposited first material becomes a vein having the color of the first material;
wherein the first device causes the force to be applied to the first portion of the slab from below the first portion of the slab, and thereafter, the first material is deposited into the first crack of the slab from above the first portion of the slab; and
wherein the first device continues to cause the force to be applied to the first portion of the slab from below the first portion of the slab, while the first material is deposited into the first crack of the slab from above the first portion of the slab.

2. The method of claim 1 further comprising
moving the slab over at least a portion of the first device before causing the first portion of the slab to move vertically out of alignment.

3. The method of claim 1 further comprising
causing a second portion of the slab to move vertically out of alignment with an area of the slab surrounding the second portion of the slab and thereby introducing a second crack in the second portion of the slab by using a second device located between the second portion and a ground surface to cause a force to be applied to the second portion of the slab; and
depositing a second material having a color into the second crack of the slab, so that the second crack with the deposited second material becomes a vein having the color of the second material.

4. The method of claim 3 wherein
the first device is a first cylinder; and
the second device is a second cylinder.

5. The method of claim 1 further comprising
causing a plurality of further portions of the slab to move vertically out of alignment with corresponding areas of the slab surrounding the corresponding plurality of further portions of the slab and thereby introducing a corresponding plurality of further cracks in the plurality of further portions of the slab by using a plurality of further devices each located between each of the corresponding portions and the ground surface;
depositing a material having a color into the plurality of further cracks of the slab, so that the plurality of further cracks of the slab become veins having a color of a deposited material.

6. The method of claim 5 wherein
each of the first device and the plurality of further devices is a cylinder.

7. The method of claim 1 wherein
the first device is a cylinder.

8. The method of claim 1 further comprising
wherein a computer processor controls the steps of causing the first portion of a slab to move vertically out of alignment with an area of the slab; and depositing the first material having a color into the first crack of the slab.

9. The method of claim 1 wherein
the slab is a damp particulate mixture.

10. A method comprising
causing a first portion of a slab to move vertically out of alignment with an area of the slab surrounding the first portion of the slab and thereby introducing a first crack in the first portion of the slab by using a first device located between the first portion and a ground surface to cause a force to be applied to the first portion of the slab; and
spraying a first material having a color into the first crack of the slab, so that the first crack sprayed with the first material becomes a vein having the color of the first material;
further comprising causing a plurality of further portions of the slab to move vertically out of alignment with corresponding areas of the slab surrounding the corresponding plurality of further portions of the slab and thereby introducing a corresponding plurality of further cracks in the plurality of further portions of the slab by using a plurality of further devices each located between each of the corresponding portions and the ground surface; and
spraying a material having a color into the plurality of further cracks of the slab, so that the plurality of further cracks of the slab become veins having a color of a sprayed material; and
wherein the first device and the plurality of further devices are arranged in a matrix of a plurality of rows and columns.

11. A method comprising
causing a first portion of a slab to move vertically out of alignment with an area of the slab surrounding the first portion of the slab and thereby introducing a first crack in the first portion of the slab by using a first device located between the first portion and a ground surface to cause a force to be applied to the first portion of the slab; and
depositing a first material having a color into the first crack of the slab, so that the first crack deposited with the first material becomes a vein having the color of the first material;
causing the first crack to close and the first portion of the slab to move vertically back into alignment with the area of the slab surrounding the first portion by no longer applying the force to the first portion of the slab after the first material is deposited into the first crack; and
wherein the slab is a damp particulate mixture.

12. A method comprising
causing a first portion of a slab to move vertically out of alignment with an area of the slab surrounding the first portion of the slab and thereby introducing a first crack in the first portion of the slab by using a top surface of a first device located between the first portion and a ground surface to cause a force to be applied to the first portion of the slab; and
depositing a first material having a color into the first crack of the slab, so that the first crack deposited with the first material becomes a vein having the color of the first material;
further comprising causing a plurality of further portions of the slab to move vertically out of alignment with corresponding areas of the slab surrounding the corresponding plurality of further portions of the slab and thereby introducing a corresponding plurality of further cracks in the plurality of further portions of the slab by using a plurality of top surfaces of a plurality of further devices, respectively, each located between each of the corresponding portions and the ground surface; and depositing a material having a color into the plurality of further cracks of the slab, so that the plurality of further cracks of the slab become veins having a color of a deposited material; and wherein the first device and the plurality of further devices are arranged with respect to each other so that none of the top surfaces of any of the first device and the plurality of further devices, overlap any of the other top surfaces of any of the first device and the plurality of further devices; and wherein the slab is a damp particulate mixture.

\* \* \* \* \*